United States Patent Office 3,780,150

Patented Dec. 18, 1973

3,780,150

USE OF MENHADEN OIL TO DEFLOCCULATE DRY GROUND ALUMINA IN MANUFACTURE OF SUBSTRATES

Harold Wilbur Stetson, Newtown, Pa., and Warren Joseph Gyurk, Pluckemin, N.J., assignors to Western Electric Company, Incorporated, New York, N.Y.

Application May 6, 1970, Ser. No. 37,373, now Patent No. 3,698,923, which is a continuation of abandoned application Ser. No. 634,370, Apr. 27, 1967. Divided and this application Apr. 27, 1972, Ser. No. 248,238

Int. Cl. C04b *33/18, 35/10*

U.S. Cl. 264—63 8 Claims

ABSTRACT OF THE DISCLOSURE

Dry ground alumina is ball milled with an azeotropic solvent mixture, a grain growth inhibitor, and periodic additions of menhaden oil until the surface area of the alumina is increased to 12 to 15 m.$^2$/gm. This material is then mixed with additional solvent, polyvinyl butyral and a plasticizer mixture to form a slip. The slip is de-aired and formed into a thin film on a moving support tape with doctor blade. After drying the film is removed and formed into substrates of the desired shape. The substrates are supported on a flat surface and covered with a flat body of sufficient weight to prevent warping during firing. The surface finish of the fired substrates is less than 3.5 in.

RELATED APPLICATIONS

This is a division of application Ser. No. 37,373, filed May 6, 1970, now U.S. Pat. No. 3,698,923, which is a continuation of application Ser. No. 634,370, filed Apr. 27, 1967 and now abandoned.

BACKGROUND OF THE INVENTION AND DEFINITIONS

This invention relates generally to ceramics and, more particularly, to the production of high-alumina bodies which have very smooth surfaces. Still more particularly, the invention relates to the production of thin, high-alumina substrates for use in the electronics industry. The invention includes the method for preparing the bodies, the casting slip, the air-dried, so-called "leather hard" tape, and the as-fired ceramic body.

Ceramics have always played an important role in the electrical and electronics industries, due to their well-known insulating properties. The advent of thin film devices such as tantalum capacitors, resistors and the like created the requirement that the insulating base to which they are applied, commonly referred to as the substrate, have a very smooth surface finish and a highly uniform surface texture. The reason for this is obvious when the dimensions of such devices are considered. The layer of tantalum adjacent the substrate in a tantalum thin film capacitor may range from a few hundred to a few thousand angstroms (A.). If the surface finish of the substrate is only, say, 20 microinches ($\mu$in.), the tantalum layer may well be discontinuous, because the "hills and valleys" of the substrate are higher than the tantalum thin film (1 $\mu$in. equals 254 A., so 20 $\mu$in.=5080 A.). Even if the tantalum layer is continuous, the very substantial differences in its thickness may cause the anodized tantalum oxide layer on is surface to break down in service. The requirement of smoothness of substrates for resistors has until recently been less stringent, but photo-etched resistor patterns can now be so small that they diffract light, and similar problems are encountered. In microelectronic circuits, the circuit path can be as small as a few microns ($10^4$ A.), so the same problem is present.

To produce substrates which overcome these problems, prior workers have employed principally four materials: mica, glass, alumina and barium titanate. Cleaved mica has one of the smoothest surfaces known, presenting a surface finish in the range of 10–20 A. Needless to say, the expense of cleaved mica precludes its use for anything but the most sophisticated experimental work. Barium titanate has electrical properties which are important for certain specialized applications, but its cost is too great for large scale use in instances other than where these properties are specifically called for. Ordinary glass microscope slides have a surface finish of about 0.5 $\mu$in. and, being inexpensive, have been much used by workers active in the field. From the standpoint of electrical and thermal properties, glass is less desirable than alumina, however, and more importantly, glass has a tendency to fracture locally during the bonding of leads to the thin film device. Alumina ceramics have most desirable physical and electrical properties, but heretofore the smoothest surface that could be obtained by well-known slip casting and firing techniques was in the neighborhood of 15–20 $\mu$in. Polishing techniques are effective to bring the surface finish down to close to 6–10 $\mu$in., but further improvement through polishing is not believed to be possible, because porosity increases with the grinding action. Also, impurities in the as-fired alumina ceramic are located at the grain boundaries, and the hardness of the substrate consequently varies between the grains and the grain boundaries. Of course, polishing is itself an operation which significantly raises the cost of the substrates.

As a result of the foregoing problems with alumina substrates, their chief usage has been in the glazed condition. Glazed alumina bodies have surface finishes in the order of 0.5 $\mu$in., the same as glass slides. The cost of glazing, on the other hand, increases the cost of the substrate by about 50%. Further, care must be taken that the particular glaze employed does not significantly alter the electrical properties of the substrate. Yet another problem with alumina substrates has been that only one side thereof was useable, that being the side held against the casting sheet; the upper side (exposed to the atmosphere) has had a much rougher surface.

Prior to discussing the present state of the art of slip casting high-alumina substrates, some attention should be directed to the techniques of measuring surface finishes. At least 10 different methods have been proposed for measuring a surface profile (cf. "Friction and Surface Finish," Proceedings of Special Summer Conference, Chrysler Corp., 1940). The two methods which have found favor among workers in the field of ceramic substrates and dielectrics are, firstly, the root mean square deviation from the mean surface (called RMS) and, secondly, the center line average method (called CLA), also known as the arithmetic average (AA). The latter is based on British Standard 1134:1950. The CLA or AA is the average deviation of a surface from the mean or center line, expressed in microinches. The center line is parallel to the general direction of the profile of the surface and located so that the area of the solid ("hills") above the line and the area of the open space ("valleys") below the line are equal. Each measurement taken in a profile reading is added and the total is divided by the number ($n$) of measurements taken to obtain a CLA measurement.

It is important to note that surface finish and flatness are distinct properties; finish is, essentially, a "micro" property measured in microinches, whereas flatness is a "macro" property measured in inches per inch. Thus, good substrates should be flat within 0.01 in./in. and have a finish of less than a few $\mu$in.

In this application, all surface finish measurements given are CLA measurements made on a Taylor Hobson Talysurf equipped with a recording CLA attachment. A onetenth mil diamond stylus was employed as the profile tracing member.

The present state of the art, insofar as methods of preparing and firing ceramic substrates are concerned, is believed to be accurately summarized in U.S. Pat. No. 2,966,719 of J. L. Park, Jr., assignor to American Lava Corp. The slip is prepared by mixing together the finely divided alumina, a volatile organic solvent, a wetting agent, and an organic binder which is soluble in the solvent. A compatible plasticizer may have to be used with the binder. The quantity of additive (i.e. anything other than the ceramic particles) is held to the minimum consistent with maintaining proper viscosity, etc. The slip is de-aired and cast onto a supported, moving film which is made of a material which will not cause the slip to bond thereto. Cellulose acetate, "Mylar" and "Teflon" (trademarks) are suitable. The cast slip is dried at a temperature sufficient to drive off the solvent, producing a tape of ceramic in the so-called "leather hard" state. The tape is then punched to the size desired for the substrate (allowing for shrinkage) and fired to a rigid ceramic.

Park does not discuss surface finishes, but the figures quoted hereinabove as illustrative of the best available for as-fired, polished and glazed alumina substrates were published in 1965, some four years after issuance of the Park patent ("Ceramic Substrates for Microcircuitry," IEEE Trans., vol. PMP–1, pp. s264–6).

Heretofore, the surface finish attainable on an as-fired alumina substrate was considered to be directly proportional to the particle size of the alumina which was the raw material, and heretofore, this was in fact the case. As producers of alumina succeeded in grinding the material to successively smaller size ranges, substrates produced therefrom had progressively better surfaces: they improved from 30 $\mu$in. to 20 $\mu$in. to 15 $\mu$in., using substantially the same slip preparation and casting techniques, as better grades of alumina become available. However, further improvement in the surface finish obtainable has proved elusive, even with better grades of alumina now available. While the exact reason for this is not known, it is considered at least possible that the size of the individual alumina particles in these newer aluminas approaches the colloidal range, thus substantially changing both the surface and bulk handling properties of the material.

The production of any dense body ("dense" as used herein meaning the opposite of porous, rather than the thoretical density of a solid) from particulate material without fusion, requires the use of a size-graded or size-ranged mixture. This is obvious since particles of random shape but equal size will manifestly form a porous body, just as will a group of spheres of equal diameter. The same rule holds true whether the dense body is to be a road bed or a fine ceramic. Little particles must be available to fill in the holes between the big particles. One of the serious problems in the production of smooth alumina substrates is that at the extremely small particle sizes of the raw material, there is no completely accurate and reliable method of measuring either particle size or particle size distribution. This is so in spite of intensive efforts of many workers, and application of the most sophisticated techniques. This difficulty is particularly apparent with the dry ground aluminas discussed below. The ordinary method of determining size distribution involves dispersion of the material in a Calgon solution with intense agitation prior to analysis by the Mine Safety Appliance centrifuge method. With dry ground aluminas, however, there is a tendency for the particles to pelletize during the final stages of grinding, and complete dispersion of the particles is thus not possible. If one were to believe the results of size distribution analyses made on these materials, one would reach the anomolous conclusion that particle size increased during hte finial grinding (see "Grinding Low Soda Alumina," Hart et al., Am. Cer. Soc. Bull., vol .43, No. 1, 1964, pp. 13–17). It is known, however, that some available aluminas have a suitably broad size distribution and some do not, and it is essential to use aluminas having such a particle size range if a dense body is to be produced. These aluminas will be referred to herein as size-graded aluminas.

In the absence of reliable size and size distribution information, one must turn to indirect measurement means. The grinding or comminution of a solid is, in essence, a process of increasing its surface-to-volume ratio, and there are accurate, well known techniques for measuring the surface area of a given quantity of a particulate solid. This figure, commonly expressed as square meters per gram (m.$^2$/gm.), is thus a relative indicator of particle size, i.e., a material that measures 5 m.$^2$/gm. is manifestly of a smaller particle size than one that measures 1 m.$^2$/gm. The common method of determining surface area is the B.E.T. gas adsorption method, wherein a monolayer of gas molecules is adsorbed on the material and the volume adsorbed is measured at particular temperatures and pressures. In discussing the process and product of the present invention, therefore, the condition of the alumina will be referred to as a particulate, size-graded mixture of specified surface area, it being understood that this is considered the most accurate definition available.

The newer aluminas referred to above, those with smaller particle sizes but which did not heretofore produce superior substrates, are produced in a somewhat different manner than those previously available. In particular, the grinding or milling operation after calcining is carried out dry rather than in a liquid medium. While the reason for the improved results obtained by this method are not known or at least have not been published by the producers, it appears probable that the separation of the liquid media from the particulate material, and subsequent washing operations, inevitably resulted in the loss of some solids, most likely a fraction of the very smallest particles. Another possible improvement due to dry grinding is that, by eliminating the washing steps, which are necessarily imperfect unless repeated a vast number of times, the number of ions adsorbed on the surfaces of the particles, particularly OH ions, may have been reduced or substantially eliminated. Such ions are known to effect surface properties. Whatever the cause, it has been determined that success of the instant invention requires the use of dry ground alumina, and will be referred to as such.

Lastly, in the production of substrates for electronic purposes, any as-fired compositions containing more than about 95% alumina are referred to as "high-alumina"; as used herein, however, the term refers to 99+% $Al_2O_3$.

Further definitions of specific additives and procedures are set forth hereinbelow in the detailed description of the invention.

OBJECTS OF THE INVENTION

It is a general object of the present invention to provide a high alumina body having a surface finish of less than 3.5 $\mu$in. in the as-fired condition.

Another object of the invention is to provide an as-fired high alumina substrate having a smoother surface finish than has heretofore been available.

Yet another object of the invention is to provide a high alumina body having zero water absorption and a surface finish of less than 3.5 $\mu$in. in the as-fired condition.

Still another object of the invention is to provide a thin, high alumina body useful in electronic applications having zero water absorption and an as-fired surface finish of less than 3.5 $\mu$in. on both major surfaces.

Another object of the invention is to provide thin, as-fired, high alumina bodies suitable for use as substrates for thin film capacitors, resistors and other miniature circuit elements.

A further object of the invention is to provide a casting slip from which the above-described high alumina bodies can be produced.

A still further object of the invention is to provide a leather-hard ceramic tape from which the above-described high alumina bodies can be produced.

Another object of the invention is to provide a method for producing the above-described high alumina bodies.

Still another object of the present invention is to provide as-fired, high alumina substrates which are competitive on a quality basis with glazed alumina substrates for many applications, but which are substantially cheaper to produce, and to provide a method for producing the same.

Various other objects and advantages of the invention will become clear from the following detailed description of the method, the intermediate and final products, their structure and properties, and the accompanying drawings and photomicrographs. The novel features of the invention will be particularly pointed out in connection with the appended claims.

SUMMARY OF THE INVENTION

As noted hereinabove, the product of the invention is a dense, high alumina body having a surface finish of less than 3.5 μin. in the as-fired condition. Surface finishes of 2 μin. are readily achieved. The product is further characterized by zero water absorption (a measure of non-porosity), a maximum alumina grain size of about one micron, and an average grain size of considerably less than one micron. The surface finish can be controlled to within the above limits on both major surfaces of substrates.

The method of the invention which produces these bodies involves a number of carefully controlled steps which may be summarized as follows. Size-graded, dry ground alumina is milled with a volatile organic solvent and a grain size inhibitor, with periodic additions of a deflocculant, until the alumina has a surface area of at least 12 m.$^2$/gm., and preferably about 15 m.$^2$/gm. In the grinding equipment used, it took about 120 hours to reach the latter figure. Without removing the milled mixture, a second organic solvent, a binder and a mixture of two plasticizers are added in controlled amounts and the mixture is milled for an additional period to achieve proper dispersion of all ingredients. The finished slip is transferred to appropriate containers and de-aired. For preparing thin substrates, casting is carried out in the conventional fashion, but special attention must be paid to the moving film onto which the slip is cast to prevent sticking. The cast material is air dried on the film, and punched into desired shape either before or after removal of the film. Firing is carried out in a conventional kiln at temperatures in the range of 1425–1550° C. for periods ranging from 20 minutes to 3 hours, the substrates being weighted with covers to prevent warpage.

It is to be emphasized that the composition of the slip is quite critical and the above summary merely outlines the type of additives used and the steps followed.

THE DRAWINGS

The detailed description of the method and product of the invention, set forth hereinbelow, will refer to the accompanying drawings and photomicrographs, wherein:

FIG. 1 comprises portions of three surface profile measurements (lithographed from the original CLA recorder). FIG. 1A shows a 23 μin. surface profile and FIG. 1B shows a 15.8 μin. surface profile; these are typical of prior art as-fired alumina substrates. FIG. 1C shows the profile of a substrate made in accordance with the invention, wherein the finish is 2.4 μin. Vertical magnification in each of these traces is 10,000, and linear magnification is 100.

FIGS. 2A–C comprise three electron photomicrographs of the surfaces whose profiles are illustrated in FIGS. 1A–C, respectively. Original magnification was in each instance 9,100×, reduced about 25% in reproduction of the patent. The scale indicates one micron.

DESCRIPTION OF THE METHOD

Figure 1A:
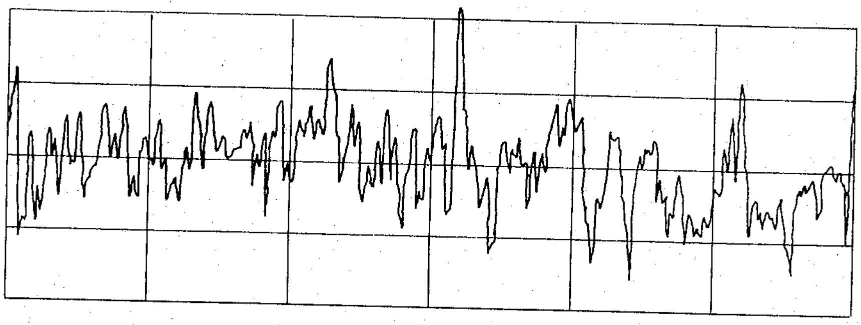
FIG. 1A PRIOR ART

The method of the invention will be described as it is applied to the manufacture of thin (0.025 in.) substrates.

As a raw material, Alcoa A–16 alumina is preferred. This is a dry ground, calcined, size-graded alumina which has a surface area (as received) of 11 m.$^2$/gm. Of course, other dry ground, size-graded aluminas may be employed. It is not felt that the surface area (i.e. particle size) of the material is initially important except insofar as it will affect milling time. It is posssble that, in the future, aluminas that have about a 12–15 b.$^2$/gm. surface area will become commercially available, in which case the milling step can be eliminated. That the A–16 grade is considerably finer than other grades, however, is evidenced by the fact that the A–15 grade has a surface area of 5 m.$^2$/gm. ad A–14 has a surface area of only 1.5 m.$^2$/gm.

The time spent in milling a batch of alumina will depend on three factors: (a) the as-received size, (b) the milling equipment employed, and (c) the quality of finish desired on both surfaces. Correlations between milling time, surface finish and particle surface area are discussed hereinbelow in connection with FIG. 5.

The work described herein was carried out in a size 2 borundum fortified mill with cylindrical borundum (13/16" x 13/16") as the grinding media. It will be appreciated that larger and better equipment is available which will make milling faster and more efficient. It is to be noted, however, that since some pick-up of the grinding media is inevitable, the grinding medium should be one that does not contain any deleterious elements (borundum is 85% $Al_2O_3$, 12% $SiO_2$, 2% MgO and 1% CaO).

The milling is carried out in the presence of a liquid carrier, which for obvious reasons should be the solvent component of the final slip composition. As noted hereinbelow, it is preferred to ultimately employ an azeotropic mixture of two solvents, but for milling purposes there is no apparent reason for adding one, the other, or the mixture. The proportions of alumina to solvent added for milling is likewise not critical, so long as the mixture has a watery or milk-like consistency. With A–16 alumina as the raw material, an alumina-to-solvent ratio of about 1.7 gave a good consistency.

The addition of a grain-growth inhibitor is preferable, for the known reason that the presence thereof allows a wider latitude in firing times. To insure complete dispersion, this material should be added during milling. The effect of grain growth inhibitors is discussed hereinbelow. They are, essentially, merely impurities of a certain kind, and their use is well known in the ceramic industries. Typical compounds are MgO, NiO and talc, the latter being an acid metasilicate of magnesium of formula $H_2Mg_3SiO_{12}$. The selection of a particular grain growth inhibitor is not critical to the process, but talc is preferred because it is readily available, cheap and comes as a very fine powder. Naturally, the amount of inhibitor added should be held to a minimum consistent with its desired effect. Addition thereof is preferred at a level of about 0.5 wt. percent of the alumina. The talc preferred herein was Whittaker Clark and Daniels WCO–339.

It is absolutely essential that a deflocculant be used during milling to keep the alumina evenly dispersed in the solvent, i.e. to prevent agglomeration. While the addition of such materials is common in the wet milling of ceramic materials, it has been found that when working the fine aluminas used herein, it is preferable that the deflocculant be added in small increments periodically throughout the milling operation. Small alumina agglomerates or precipitates are likely to form and ruin the batch without sufficient deflocculant addition. Fatty acids and synthetic surfactants such as the benzene sulfonic acids are suitable deflocculants. However, the criteria for deflocculant selection for the present invention is that one which will do a good job in the least volume of addition. Natural fish oils perform very well and, in particular, a menhaden oil marketed under the trade name of Ensign Z–3 by Haynie Products Inc. is preferred. A total addition of this oil amounting to about 1.5 to 2.0 wt. percent of the alumina was found sufficient.

With the above-noted ingredients in the mill, the milling is commenced and, with periodic addition of the deflocculant, continued until the material has a surface area of at least 12 m.$^2$/gm. and preferably about 15 m.$^2$/gm. These are not arbitrary figures. It was not found possible to obtain surface finishes of under 3.5 $\mu$in. unless the alumina surface area was at least 12 m.$^2$/gm. With alumina having the preferred surface area of about 15 m.$^2$/gm. it is possible to achieve surface finishes of between 1.9 and 2.4 $\mu$in. on both sides of the substrate. Further milling to even smaller sizes has not been attempted, but it is strongly suspected that at such smaller sizes, say above 16 m.$^2$/gm., other factors would come into play and, for one reason or another, cause critical problems. This suspicion is based at least in part on the fact that many unexpected problems, specifically, agglomeration of the material during milling, inflexibility of the cast slip, and incomplete separation of the cast slip from the carrier film, had to be overcome to achieve success with the 15 m.$^2$/gm. material. The agglomeration problem was overcome by the periodic addition of a deflocculant, as described above. The inflexibility problem was overcome by the appropriate choice of plasticizers, and the incomplete separation problem was overcome by the appropriate choice of carrier film, as will be described in more detail below. Furthermore, it is not known if any significant further reduction is even possible, as evidenced by the tests reported below.

In the batches milled in the above-noted equipment, and with A–16 starting material (11 m.$^2$/gm.), it generally took about 120 hours to obtain a 15 m.$^2$/gm. surface area measurement, and doubling the milling time (250 hours total) showed no measureable increase in surface area.

At the completion of milling, it is advantageous to leave the material in the mill and add the other slip components thereto, since the mill can also be used to mix the additional ingredients. Of course the milled mixture, which has the consistency and appearance of thin milk, may be removed to a separate mixer for this purpose, if desired.

All of the additional slip components are added at this time and the order of addition is not important.

As noted above, a portion only of the total solvent requirement was added prior to milling, in the case cited this being trichloroethylene. The first requirement for the solvent is that it be volatile at low temperatures so that it will be driven off as the tape dries. Organic solvents are thus the obvious choice. The solvent must also be effective to dissolve the binder, of course, and it should be nonflammable and preferably have a low viscosity. As a general rule, a solution of two solvents will have a lower viscosity than a single solvent. However, to avoid one solvent component being driven off prior to the second, which can create difficulties during drying, the solvent mixtures should be azeotropes.

The presence of water in the drying slip is felt to be deleterious to the tape as it will not ordinarily be driven off during drying and may leave holes when driven off during firing. As a result it is preferred that one of the solvent components be soluble in water, and an alcohol is preferred in this service. The alcohol need not be anhydrous when added, as any other water in the system will still dissolve therein, and the water will be carried with the alcohol during drying. Ethyl alcohol and trichloroethylene form an azeotrope and meet all of the other requirements listed above (including dissolving the binders discused below) and an azeotropic mixture of these two solvents is the preferred solvent for use with the invention.

The function of the binder is to retain the alumina particles in undisrupted position after the organic solvent is evaporated, i.e. to hold the tape together until it is fired into a hard ceramic. In carrying out this function, the binder must not cause any cracks, pinholes or other imperfections in the tape or fixed ceramic and, of course, it must volatilize at the firing temperature. Selection of a binder is in part dependent on the surface onto which the slip is cast, in that the binder will bond more or less to the surface during drying. As noted hereinbelow, the preferred casting surfaces are cellulose acetate, Mylar (glycol terephthalic acid polyester) and Aclar (trademarks), the latter being a fluorohalocarbon film made from fluorinated-chlorinated resins by Allied Chemical Co.; grade 33C is preferred. A chromium-plated stainless steel belt can also be used as a casting surface. For casting on these surfaces polyvinyl butyral resins are preferred as binders. Use of these binders when casting on glass is not impossible, but great care must be exercised when removing the tape therefrom to prevent tearing, as the bond formed is considerably stronger.

Several grades of polyvinyl butyral resins are marketed under the trade name "Butvar" by the Shawinigan Resin Corp. While these are all commonly used in ceramic preparation, the desirable features required for use in the present invention are low viscosity and effectiveness at low concentrations. Accordingly, the Butvar B–98 grade is preferred. This has a lower viscosity than other grades, due to a lower molecular weight (under 50,000), and is effective at an addition level of 2.5 wt. percent of the alumina in the slip. Other binders common in the industry are polymethyl methacrylate resin, cellulose acetate butyral resin, etc., but these are not found to be as satisfactory as the polyvinyl butyral resins.

Ordinarily in the preparation of most ceramics, the binder must be "compatibly plasticized" with a suitable plasticizer unless the binder itself is of a very low viscosity. The function of the plasticizer is to improve the flexibility and workability of the dried (i.e. solvent-free) tape. As plasticizers for polyvinyl butyral resin binders, polyalkylene glycol derivatives such as triethylene glycol hexoate have been proposed heretofore as being fully compatible. However, when used to prepare the slips of the present invention, this plasticizer resulted in a slip which was too stiff to cast properly. On the other hand, other supposedly compatible plasticizers, such as methyl abietate, dimethyl phthalate or tricresyl phosphate, all resulted in substrates having crazed or "mud flat" surfaces. While the reason for this is not known, it is speculated that these plasticizers become somehow oriented within the slip and create tensional forces between the surface and bulk volume areas of the cast tape, when driven off during drying. The polarity of the plasticizer molecule may be a factor.

It was found that the stiffness of the glycol plasticizer could be overcome and the crazing of the other plasticizers eliminated if the glycol was mixed with a second plasticizer, preferably of the phthalate type. In particular, it was found that excellent results were obtained by mixing about 4 parts of glycol with about 6 parts of a mixed phthalate ester of normal hexyl, octyl and decyl alcohols such as is marketed by Allied Chemical Co. as P–61.

The addition of a plasticizer is ordinarily expressed as parts per hundred of resin ("pphr.") and, to get a suitable result, plasticizer addition to the slip of the invention (i.e. the mixture noted above) should be about 250–300 pphr. The glycol plasticizer which is preferred is marketed by Union Carbide Corp. As UCON 2000 (the 2000 representing its viscosity measured in centipoises). The total plasticizer addition amounts to about 7 wt. percent of the slip.

After the additions of solvent, binder and plasticizer have been completed, the mill is closed and run for a sufficient period to insure a complete and intimate mixture of all ingredients and the formation of a completely uniform slip. Generally, 10–20 hours, preferably about 16 hours, was sufficient in the mill used herein.

The finished slip has the appearance and viscosity of heavy cream, and is completely smooth. While slips having this general viscosity proved satisfactory and no close control was kept on viscosity (other than measurement by eye), it will be understood that large scale usage of the invention will involve careful viscosity control, since shrinkage during firing is directly related thereto.

Casting of the slip follows conventional procedures. The de-aired slip is pumped into a reservoir at a rate equal to the casting rate, care being taken not to introduce air bubbles during pumping. Thus, an approximately constant level of the slip is maintained in the reservoir, resulting in a constant hydrostatic pressure. The casting sheet is pulled across the open bottom of the reservoir and under a doctor blade, which is set at the desired height of the substrate thickness. The casting sheet, cellulose acetate, Mylar, etc., should be supported on a smooth surface such as glass. As the slip will start to solidify immediately on contact with the atmosphere, it is advisable to cover the top of the reservoir and the tape coming out from under the doctor blade to prevent lump formation. The solvent will vaporize at ordinary room temperatures, and a few hours of air drying produces the leather hard tape, which can be punched to the desired substrate size either before or after removal of the casting sheet.

The leather hard tape will tend to curl due to shrinkage, but this is no real problem. However, during firing the punched substrates will also have a tendency to curl on the edges, and this must of course be avoided if the finished substrates are to be flat. It has been discovered that warping during firing can be prevented, and a suitably flat product produced, by covering the punched tape with a previously-fired substrate before it enters the kiln. A cover which is too heavy will not allow the substrate being fired to shrink, and this will cause cracking. On the other hand, a cover which is too light will not prevent warping during firing. The use of a previously fired substrate avoids both of these problems.

Firing is carried out in air at temperatures in the range of 1425° to 1550° F., and for from 15 minutes to 3 hours. The effect of firing temperatures and time is discussed hereinbelow. In the tests described, firing was carried out in a Pereny tunnel kiln.

DESCRIPTION OF THE PRODUCT

Understanding of the invention will be facilitated by the following description of the structure and properties of the as-fired alumina ceramic produced by the method of the invention, together with a discussion of the effect of certain processing parameters thereon.

Figure 1B:
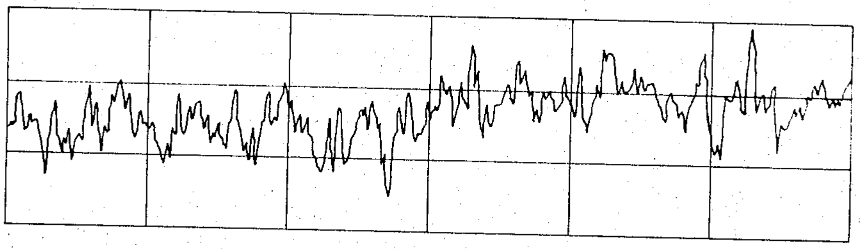
FIG. 1B PRIOR ART
Figure 1C:
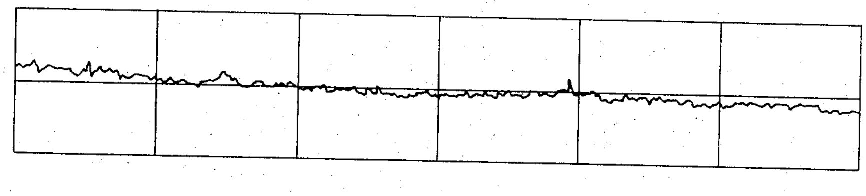
Figure 2A:
PRIOR ART FIG. 2A
Figure 2B:
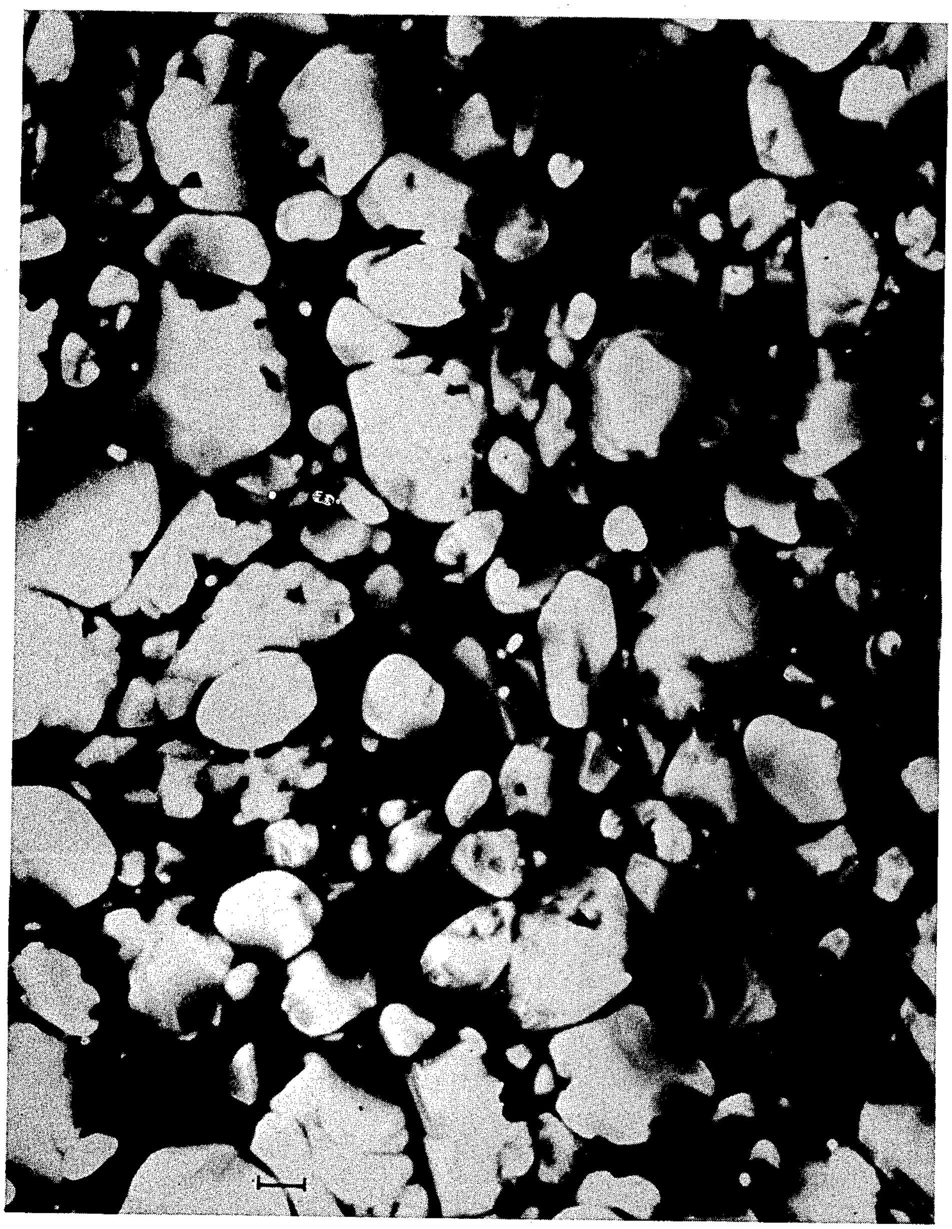
PRIOR ART FIG. 2B
Figure 2C:
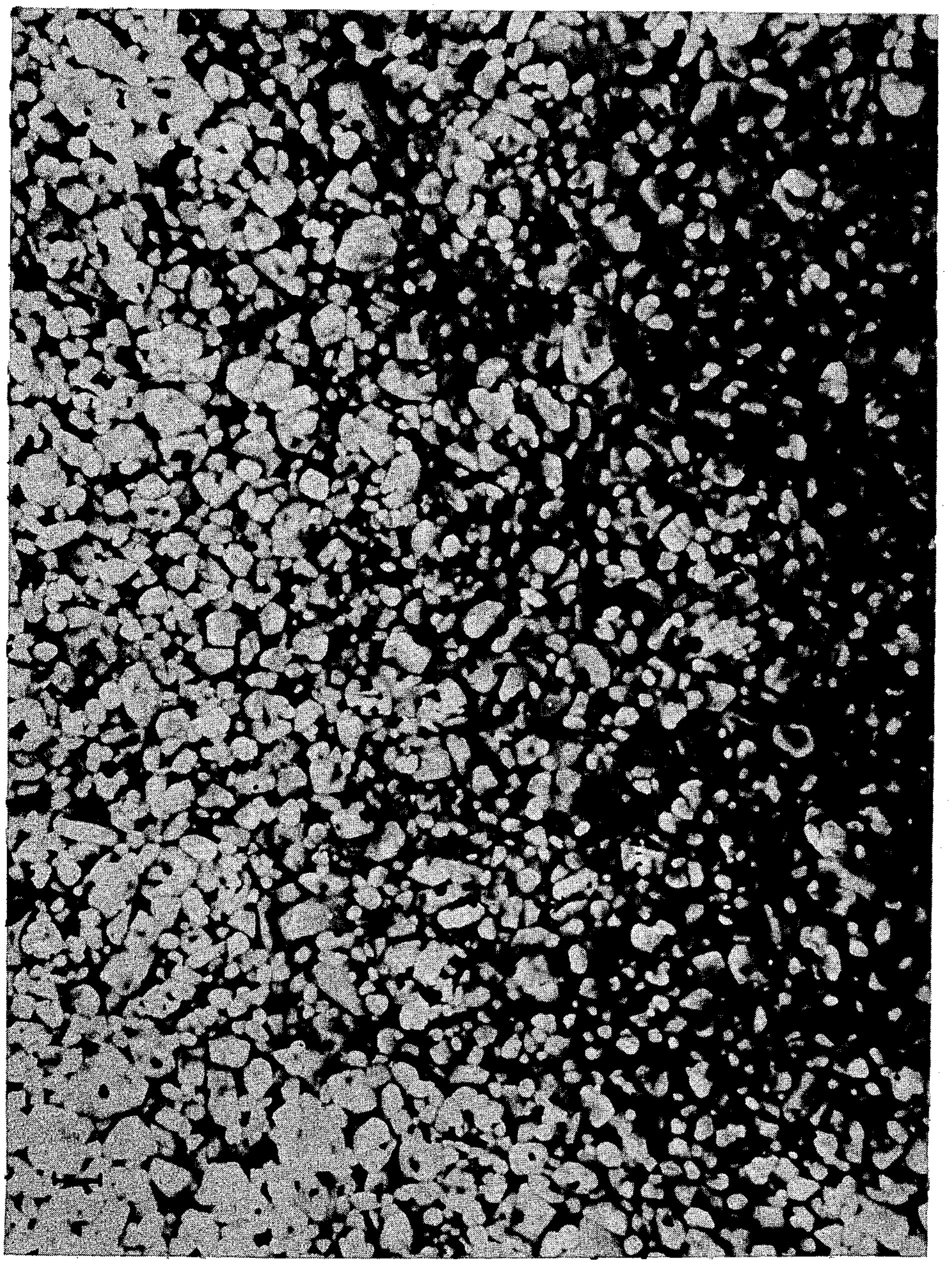

FIG. 1 shows a group of CLA surface profile traces and FIG. 2 shows a corresponding group of electron photomicrographs. FIGS. 1A and 2A illustrate a 23 μin. finish and FIGS. 1B and 2B are of a 15.8 μin. finish, both as-fired high alumina substrates typical of what has heretofore been available. FIGS. 1C and 2C show an as-fired alumina substrate made in accordance with the present invention; the surface finish is 2.4 μin. The important feature shown by FIGS. 1 and 2 is the correlation between the surface finish and the grain size of the finished substrate. The grain size of the finished substrate is a function of (a) the alumina particle size and (b) grain growth during firing. In the photomicrographs of FIG. 2, the scale indicates one micron, and in each instance magnification was 9,100×. In the substrate shown in FIG. 2A, it is clear that the average grain size is at least 6 microns, with some grains as large as 12 microns. In FIG. 2B, a few of the grains are as small as one micron, but the average grain size is clearly much larger. By contrast, in FIG. 2C, with very few exceptions the maximum grain size is one micron, and the average grain size is much smaller than one micron.

Figure 3:
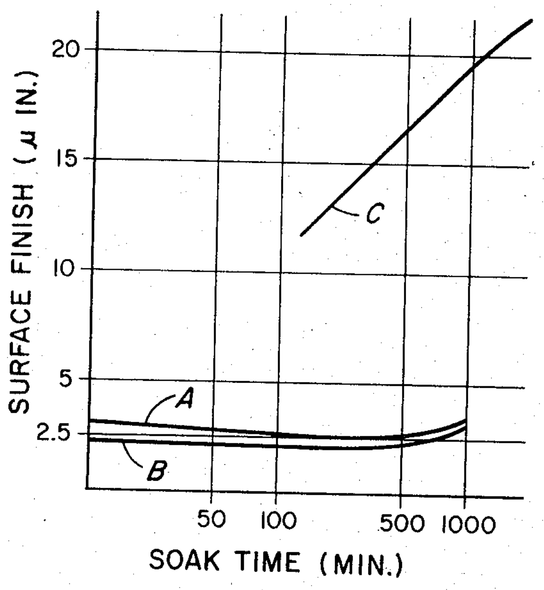
FIG. 3 is a chart showing the effect of firing time on surface finish, i.e. the effect of grain growth. Curve A is for a top surface, curve B for a bottom surface, and curve C is for a prior art (11 μin.) surface.

One of the most surprising aspects of the present invention is the fact grain growth during firing is completely negligible. The reason for this is not known. The addition of the grain growth inhibitor is a conventional step and it is added in conventional amounts. Apparently, there is a synergistic effect for which the presence of the grain growth inhibitor is only partially responsible. This lack of grain growth is illustrated in FIG. 3, which is a plot of surface finish vs. soaking time at 1425° C. Curves A and B are for the top and bottom surfaces, respectively of a substrate prepared in accordance with the invention. The grain growth inhibitor was talc. As can be seen, the fiish improves slightly during the initial period, a common phenomena caused by decrease in porosity, and is only negligibly different after 1000 minutes. By contrast, curve C shows the same parameters for a conventional substrate, in this case 96% $Al_2O_3$+2% $CaSiO_3$+2% $MgSiO_3$, fired at 1500° C. As can be seen, the finish deteriorates rapidly with increasing soaking time. For reasons obvious from curves A and B of FIG. 3, the preferred firing cycle for the present invention is 3 hours at 1425° C.

Figure 4:
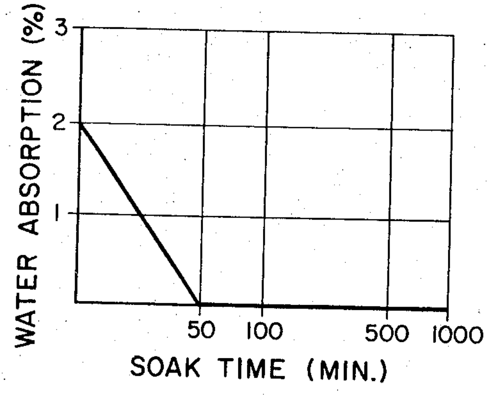
FIG. 4 is a chart showing the effect of firing time on water absorption.

Porosity of the finished substrate is lowered with increased firing time, but this is not a serious limitation on the method of the invention. The normal measure for porosity of these materials is water absorption, and satisfactory substrates should show zero (percent) water absorption. The effect of firing time on water absorption is illustrated in FIG. 4, again at a firing temperature of 1425° C. It can be seen that, in order to achieve zero absorption, the minimum firing time is about 60 minutes. It will be appreciated, of course, that an inverse time-temperature relation exists.

Figure 5:
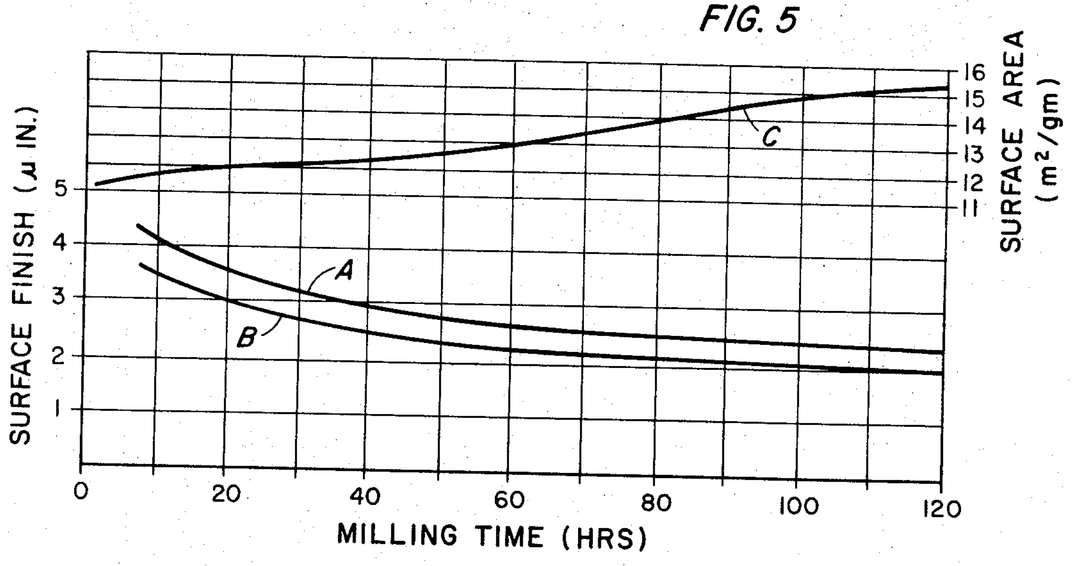
FIG. 5 is a chart showing the effect of milling time on the finish of (a) the top surface and (b) the bottom surface. An approximate correlation between milling time and surface area (c) is also shown.

As noted above, both surfaces of the substrate may be prepared with minus 3.5 μin. surfaces. This is not, however, a necessary result of the method of the invention. It has been determined that the main variable effecting finish obtained on the top surface of the substrate is milling time, or expressed differently, surface area of the milled alumina. In FIG. 5 there is shown the effect of milling time on both the top (A) and bottom (B) surface finishes of the substrate. As can be seen, a minus 3.5 μin. surface on the side next to the casting sheet (i.e., the bottom) was obtained after only 10 hours of milling, but it was necessary to mill about 25 hours in order to obtain such a finish on both surfaces. It will here be understood that these time figures are valid only for the mill and grinding media load employed, but a similar relation can be worked out by those skilled in the art for any particular milling set-up.

Curve C of FIG. 5 is a correlation between surface area measurements and milling time. As can be seen, it is necessary that the alumina have a minimum of 12 $m.^2$/gm. surface area before a 3.5 μin. surface can be obtained. It should also be noted that while surface area increases more or less linearly with milling time, surface finish is improved rapidly by the first 40 hours of milling, but only very slowly by subsequent milling. The optimum 2 μin. surfaces were obtained only after 120 hours of milling.

Figure 6:
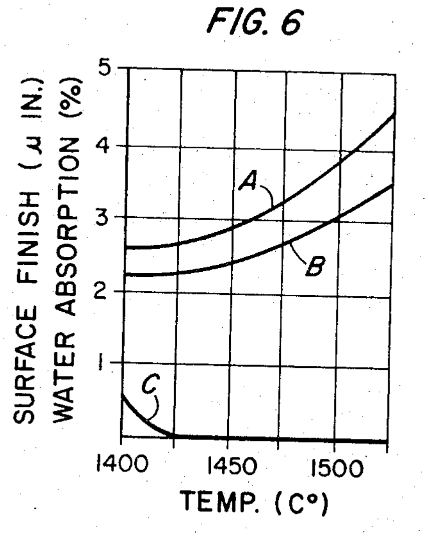
FIG. 6 is a chart showing the effect of firing temperature on (a) top surface finish, (b) bottom surface finish, and (c) water absorption, for a soaking time of about 3 hours.

The relationship of firing temperature to (A) top and (B) bottom surface finish and (C) water absorption is illustrated in FIG. 6. In the tests used to generate this data, firing time was held constant at about 3 hours, and firing temperature was varied from 1400° C. to 1525° C. As is clear from this chart, surface finish deteriorates more rapidly at the higher temperatures, due undoubtedly to grain growth. At higher temperatures, porosity is believed to drop to zero during the heat-up period prior to soaking. The net effect of using higher firing temperatures is to narrow the time period where zero water absorption (porosity) can be obtained without undue grain growth. For this reason, lower firing temperatures are preferred.

Figure 7:
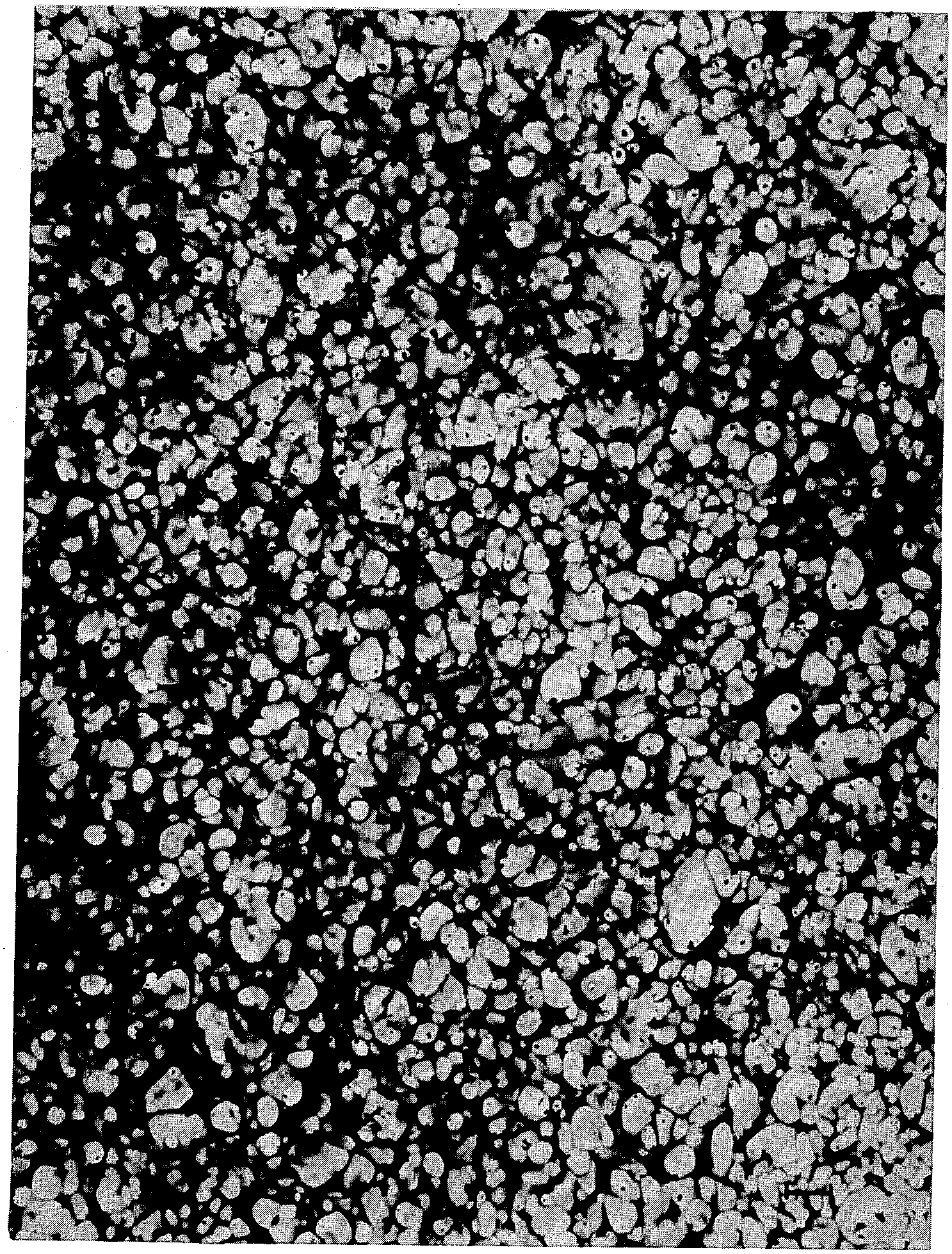
FIGS. 7 and 8 are electron photomicrographs similar to FIG. 1C but of different substrates punched from tapes made from different slip batches.
Figure 8:
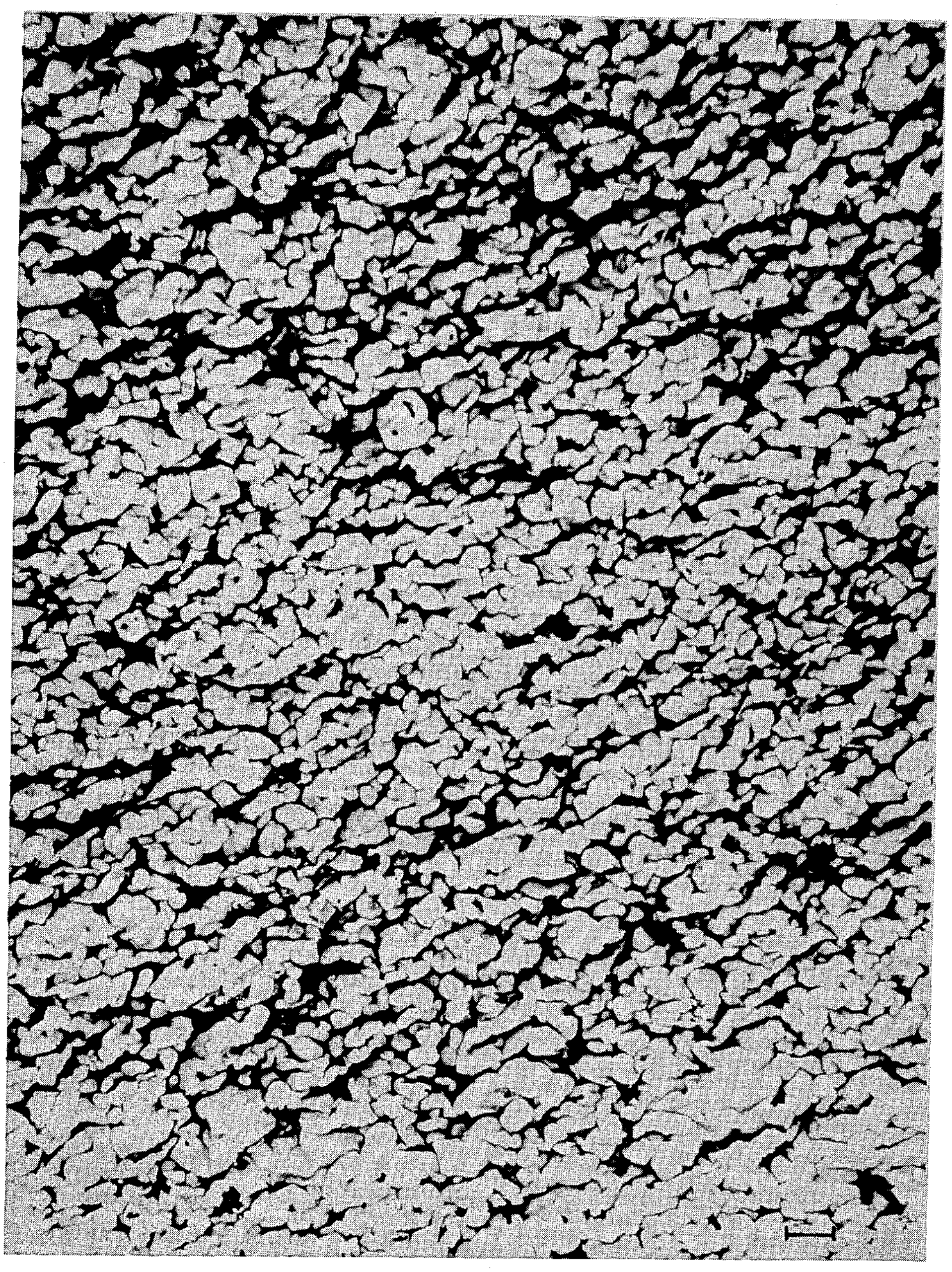

While the procedures that must be followed to obtain a minus 3.5 μin. finish and zero water absorption are in many respects critical, both in the slip preparation and firing stages, the results obtained are reproducible, as illustrated in FIGS. 7 and 8, which are electron photomicrographs of substrates made from different batches of alumina, but in strict accordance with the procedures of the invention. Each of the substrates had a surface finish of 2–3 μin. and zero water absorption. It will be noted that the grain size in each instance is a maximum of about one micron, with the average grain size being much less than one micron.

Understanding of the invention will be further facilitated by referring to the following specific example.

EXAMPLE

The following ingredients were placed in a size 2 borundum fortified jar mill:

| | Gms. |
|---|---|
| Alcoa A–16 alumina | 2985 |
| WCO–399 talc | 15 |
| Trichloroethylene | 1775 |

The grinding media was 8 kilograms of 13/16" by 13/16" borundum cylinders. A total of 55 gms. of mehaden oil (Ensign Z–3) was added during milling, in small aliquots at spaced intervals. Milling was carried out for 120 hours.

At the completion of milling, the following additional ingredients were added:

| | Gms. |
|---|---|
| Ethyl alcohol | 505 |
| Butvar B–98 polyvinyl butyral resin | 150 |
| Allied P–61 polyalkylene glycol plasticizer | 248 |
| UCON 2000 phthalate ester plasticizer | 173 |

The mixture was milled for an additional 16 hours to insure thorough dispersion of all ingredients in the slip. The finished slip was transferred from the mill to glass bottles and de-aired for five minutes at approximately 26 in. Hg.

The composition of the finished slip was as follows, in percentages by weight.

| Ingredient: | Wt. percent |
|---|---|
| $Al_2O_3$ | 50.5 |
| Trichloroethylene | 30.1 |
| Ethyl alcohol | 8.56 |
| Binder (B–98) | 2.55 |
| Polyalkylene glycol plasticizer | 2.93 |
| Phthalate ester plasticizer | 4.2 |
| Talc | 0.25 |
| Deflocculant | 0.93 |
| Total | 100.04 |

The slip was cast on 15 mil cellulose acetate supported on glass using a doctor blade set to produce a 0.025 in. tape. The cast tape was dried overnight at room temperature, and 1 x 2 in. substrates were punched therefrom without removing the cellulose acetate film.

The composition of the dried, leather hard tape was as follows.

| Ingredient: | Wt. percent |
|---|---|
| $Al_2O_3$ | 82 |
| Binder | 4.1 |
| Polyalkylene glycol plasticizer | 4.8 |
| Phthalate ester plasticizer | 6.8 |
| Talc | 0.41 |
| Deflocculant | 1.5 |
| Total | 99.61 |

The film was then removed from the casting sheet by peeling it off, and the substrates were layed on flat, fired ceramic supports. Each substrate was covered with a previously-fired substrate of the same general dimensions, and they were fired at 1425° C. for 3 hours.

The resulting substrates were flat, had a surface finish of 2–3 μin., showed zero water absorption, had a maximum grain size of about one micron, and had a density of 3.7. Electron photomicrographs of substrates made by this procedure are shown in FIGS. 2C, 7 and 8.

A second batch was prepared, cast and fired in accordance with the above procedures and the resulting substrates had a surface finish, top and bottom, of 2.3 and 1.9 μin., respectively. The slip composition of this batch varied in certain respects from the composition noted above, and is set forth hereinbelow.

| Ingredient: | Wt. percent |
|---|---|
| $Al_2O_3$ | 51.99 |
| Trichloroethylene | 26.63 |
| Ethyl alcohol | 9.94 |
| Binder (B–98) | 2.55 |
| Polyalkylene glycol plasticizer | 3.01 |
| Phthalate ester plasticizer | 4.31 |
| Talc | 0.26 |
| Deflocculant | 0.95 |
| Total | 99.96 |

Various changes in the details, steps, materials, and procedures, as described and explained herein in order to illustrate the nature of the invention, may be made by those skilled in the art, and the resulting alumina bodies will still have superior properties. It is intended that all such variations be included within the principle and scope of the invention as defined in the appended claims.

What is claimed is:

1. A process for making thin alumina ceramics comprising:

(a) milling together: (1) dry-ground alumina having a range of particle sizes, (2) an azeotropic solvent mixture comprising trichloroethylene and alcohol, and (3) a grain-growth inhibitor comprising talc, with a suitable quantity of a compatible grinding media until the surface area of the alumina is increased to about 12–15 square meters per gram, the dispersion of the alumina in the solvent being maintained during milling by periodic addition thereto of (4) a wetting agent comprising menhaden oil;

(b) formulating a slip of homogeneous character by mixing into the mixture formed in step (a): (5) additional azeotropic solvent mixture, (6) a binder resin comprising polyvinyl butyral, and (7) a plasticizer mixture comprising triethylene glycol hexoate and pthalate esters of normal hexyl, octyl, and decyl alcohols, wherein the composition of the resulting slip is, in approximate weight percentages:

| | Percent |
|---|---|
| Alumina | 50 |
| Trichloroethylene | 25–30 |
| Alcohol | 8–10 |
| Talc | Up to 0.5 |
| Menhaden oil | Up to 1 |
| Polyvinyl butyral | 2–3 |
| Triethylene glycol hexoate | 2–4 |
| Mixed phthalate esters of normal hexyl, octyl and decyl alcohols | 4–5 |

(c) de-airing said slip;

(d) spreading said slip in a thin film on a smooth, flexible and moveable supporting tape;

(e) removing the solvent mixture from the film while retaining the remaining constituents of said slip in adherent relation to said supporting tape;

(f) separating said film from said tape and forming said film into desired flat shapes;

(g) supporting said flat shapes on flat surfaces and covering said shapes with a flat body of sufficient weight to prevent warping during firing without preventing shrinkage; and (h) firing said shapes to rigid ceramics at a temperature within the range of about 1425° C. to about 1550° C. for a period of about 15 minutes to about 3 hours, the time and temperature of said firing being controlled to provide a rigid ceramic product having a maximum grain size of about one micron, an average grain size considerably less than one micron, and zero water absorption.

2. The process as claimed in claim 1, wherein said supporting tape is cellulose acetate.

3. The process as claimed in claim 1, wherein said supporting tape is glycol terephthalic acid polyester.

4. The process as claimed in claim 1, wherein said supporting tape is a fluorohalocarbon film.

5. The process as claimed in claim 1, wherein said supporting tape is chromium plated stainless steel.

6. The process as claimed in claim 1, wherein said solvent removal step (e) is carried out by drying said film for several hours at room temperature.

7. The process as claimed in claim 1, wherein said firing is carried out at about 1425° C. for about 3 hours.

8. The process as claimed in claim 1, wherein said flat body is a previously fired substrate of similar size and shape as said flat shape.

References Cited

UNITED STATES PATENTS

| | | | |
|---|---|---|---|
| 2,714,239 | 8/1955 | Minnium | 264—58 |
| 3,377,176 | 4/1968 | Wolkodoff et al. | 264—332 |
| 3,652,378 | 3/1972 | Mistler | 264—61 |
| 2,952,877 | 9/1960 | Park, Jr. | 264—63 |
| 2,966,719 | 1/1961 | Park, Jr. | 264—63 |
| 3,004,197 | 10/1961 | Rodriguez et al. | 264—63 |
| 3,125,618 | 3/1964 | Levinson | 264—63 |
| 3,212,959 | 10/1965 | Varadi et al. | 264—63 |
| 3,324,212 | 6/1967 | Paulley et al. | 264—63 |
| 3,518,756 | 7/1970 | Bennett et al. | 264—63 |
| 3,574,029 | 4/1971 | Ettre | 264—63 |
| 3,615,760 | 10/1971 | Williams | 264—61 |
| 3,627,547 | 12/1971 | Bailey | 264—61 |
| 3,631,131 | 12/1971 | Kopko | 264—63 |
| 3,637,406 | 1/1972 | Bailey | 264—63 |
| 3,695,960 | 10/1972 | Richter | 264—63 |

FOREIGN PATENTS

| | | | |
|---|---|---|---|
| 771,065 | 3/1957 | Great Britain | 264—63 |
| 842,129 | 5/1970 | Canada | 264—63 |

OTHER REFERENCES

J. J. Thompson: "Forming Thin Ceramics," September 1963, Ceramic Bulletin at 480–481.

JOHN H. MILLER, Primary Examiner

U.S. Cl. X.R.

106—65; 264—58

L-566-PT
(6-69)

UNITED STATES PATENT OFFICE
CERTIFICATE OF CORRECTION

Patent No. 3,780,150 Dated December 18, 1973

Inventor(s) H. W. Stetson and W. J. Gyurk

It is certified that error appears in the above-identified patent and that said Letters Patent are hereby corrected as shown below:

In the specification, Column 3, line 11, "additive" should read --additives--; lines 46 and 47, "thoretical" should read --theoretical--; line 73, "hte" should read --the--. Column 6, line 33, "12-15 b.$^2$/gm" should read --12-15 m$^2$/gm.--; line 39, "ad A-14" should read --and A-14--. Column 8, line 20, "discused" should read --discussed--; line 28, "fixed" should read --fired--. Column 9, line 17, "As UCON" should read --as UCON--. Column 10, line 38, "fiish" should read --finish--. Column 11, line 47, "mehaden" should read --menhaden--.

Signed and sealed this 9th day of April 1974.

(SEAL)
Attest:

EDWARD M. FLETCHER, JR.
Attesting Officer

C. MARSHALL DANN
Commissioner of Patents